July 30, 1940.　　　　　E. I. CROSS　　　　2,209,873
PLANT MARKER
Filed July 24, 1939

Earl I. Cross　Inventor

By　Hugh E. Wilkerson
　　　　　　　　Attorney

Patented July 30, 1940

2,209,873

UNITED STATES PATENT OFFICE 2,209,873

PLANT MARKER

Earl I. Cross, Taylor, N. Y.

Application July 24, 1939, Serial No. 286,287

1 Claim. (Cl. 40—19)

My invention relates to improvements in plant markers, and its general object is to provide a device of this character whereby plants, shrubs, flowers and the like may be permanently marked, thereby eliminating the possibility of losing the identity of the plants, etc.

Another object of my invention is to provide a device of this character comprising a single piece of wire or other suitable material, such as any of the well known plastics, which may be bent or moulded into the desired shape for holding a cylindrical, transparent, water-proof container, which is economical to manufacture, and in which the labels may be changed as desired or the holder moved from place to place and which can be reused indefinitely.

With these and other objects in view, as will hereinafter more fully appear and will be more particularly pointed out in the appended claims, reference is now made to the accompanying drawing forming a part of this application, in which:

Figure 1:
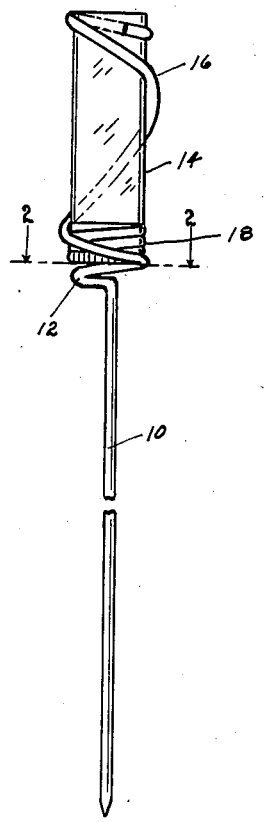
Fig. 1 is an elevational view, showing my improved plant marker.
Figure 2:
Fig. 2 is a cross-sectional view, taken on the line 2—2 of Fig. 1.

Referring now to the drawing, in which similar reference numerals represent similar parts, in Fig. 1 the numeral 10 represents the holder, which may be made of wire or other suitable metal, or any of the well known plastics, and may be of any desired color, preferably green, to blend with the color of the plants. One end of the holder 10 is bent to form a flat spiral 12, which acts as a supporting platform for the container 14. The flat spiral 12 is extended to form a helix 16, inside of which the container 14 is frictionally held. The container 14 is made of glass or any other suitable transparent material, and is provided with a threaded closure 18 of rust-proof material, having water-proof and air-proof packing not shown, inside to prevent obliteration of the indicia or data and to prevent deterioration of the specimen seed which may be stored therein.

Figure 3:
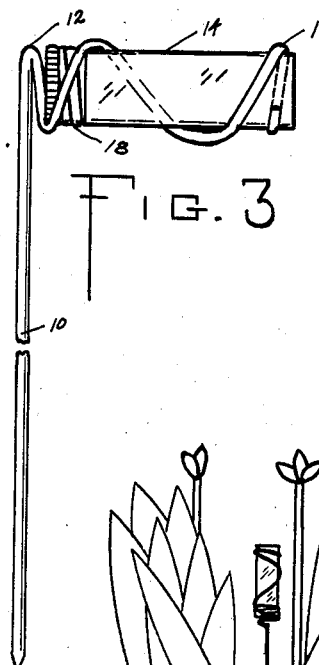
Fig. 3 is an elevational view, showing a modification, wherein the sealed container is held in a horizontal position.
Figure 4:
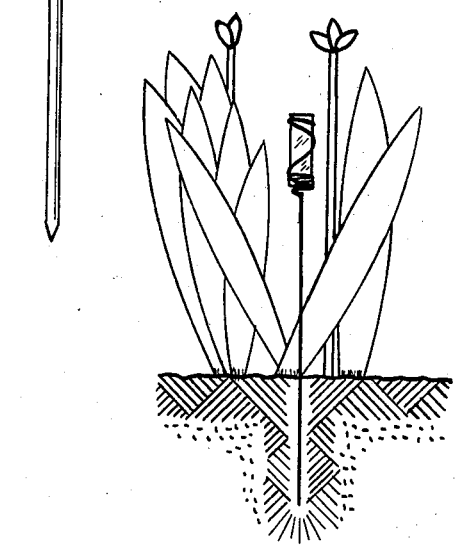
Fig. 4 is an elevational view, showing the marker in use in conjunction with plants.

The modification shown in Fig. 3 is the same as Fig. 1, except that the holder is bent at right-angles, so that the container is held in a horizontal position and the label, therefore can be read more easily.

From the foregoing description, it will be seen that I have provided a plant marker, having an air-tight, water-proof transparent container, adapted to receive a label, other desired indicia or data, such as history, kind, description, date planted, from whom purchased, etc., and in which samples of the seed may be safely stored. Further, the marker may be readily moved from place to place as desired and may be reused indefinitely.

While I have illustrated and described the invention in some detail, it is to be understood that the invention is not to be limited to such details, but only by the spirit of the invention and the scope of the appended claim.

I claim:

A plant marker of the character described, comprising, in combination, a cylindrical, transparent container, adapted to exhibit a label or the like, means for supporting the container, comprising a slender rod, near one end of which is formed a supporting platform consisting of a flat spiral, the spiral continuing to form an elongated helix, said helix frictionally encircling and supporting the container, the other end of the rod being adapted to be embedded in the ground.

EARL I. CROSS.